United States Patent
Wan et al.

(10) Patent No.: US 10,101,864 B2
(45) Date of Patent: Oct. 16, 2018

(54) TOUCH SCREEN TERMINAL AND NEAR FIELD COMMUNICATION METHOD, APPARATUS AND SYSTEM THEREOF

(71) Applicant: SHENZHEN GOODIX TECHNOLOGY CO., LTD., Shenzhen, Guangdong (CN)

(72) Inventors: Yuepeng Wan, Guangdong (CN); Jun Fang, Guangdong (CN)

(73) Assignee: SHENZHEN GOODIX TECHNOLOGY CO., LTD., Shenzhen, Guangdong (CN)

( * ) Notice: Subject to any disclaimer, the term of this patent is extended or adjusted under 35 U.S.C. 154(b) by 3 days.

(21) Appl. No.: 15/386,611

(22) Filed: Dec. 21, 2016

(65) Prior Publication Data
US 2017/0102803 A1   Apr. 13, 2017

Related U.S. Application Data

(63) Continuation of application No. PCT/CN2015/077053, filed on Apr. 21, 2015.

(30) Foreign Application Priority Data

Mar. 30, 2015   (CN) .......................... 2015 1 0145892

(51) Int. Cl.
*G06F 3/044* (2006.01)
*G06F 3/041* (2006.01)
(Continued)

(52) U.S. Cl.
CPC .............. *G06F 3/044* (2013.01); *G06F 3/041* (2013.01); *G06F 3/0416* (2013.01); *H04B 5/0031* (2013.01); *H04W 4/80* (2018.02)

(58) Field of Classification Search
None
See application file for complete search history.

(56) References Cited

U.S. PATENT DOCUMENTS 7,403,784 B2 *   7/2008   Ju .............................. G01S 5/02
                                                              342/450
8,903,313 B2    12/2014   Kang et al.
9,793,962 B2 *  10/2017   Smith .................. H04B 5/0031

FOREIGN PATENT DOCUMENTS

CN         102254136 A      11/2011
CN         102810144 A      12/2012
(Continued)

OTHER PUBLICATIONS

State Intellectual Property Office of the P.R. China (ISR/CN), "International Search Report for PCT/CN2015/077053", China, dated Jan. 12, 2016.
(Continued)

*Primary Examiner* — Kenneth B Lee, Jr.
(74) *Attorney, Agent, or Firm* — Tim Tingkang Xia, Esq.; Locke Lord LLP

(57) ABSTRACT

The present disclosure, pertaining to the communications field, discloses a touch screen terminal and a near field communication method thereof. The method includes: detecting, by the first touch screen terminal, whether a second touch screen terminal having a large-area contact is present; if the second touch screen terminal having a large-area contact is present, performing an approach detection for the second touch screen terminal by using a first signal strength threshold, and otherwise, performing an approach detection for the second touch screen terminal by using a second signal strength threshold; and when the approach detection is successful, carrying out data transmission with the second touch screen terminal.

15 Claims, 3 Drawing Sheets

(51) Int. Cl.
  *H04B 5/00* (2006.01)
  *H04W 4/80* (2018.01)

(56) References Cited

FOREIGN PATENT DOCUMENTS

| | | |
|---|---|---|
| CN | 103684550 A | 3/2014 |
| CN | 103701545 A | 4/2014 |
| CN | 104217181 A | 12/2014 |
| KR | 20080053124 A | 6/2008 |
| KR | 20130123696 A | 11/2013 |

OTHER PUBLICATIONS

State Intellectual Property Office of the P.R. China, "1st Office Action for CN201510145892.9", China, dated Jun. 16, 2017.
Korean Intellectual Property Office, "1st Office Action for KR10-2016-7036188", Korea, dated Aug. 16, 2017.

* cited by examiner

TOUCH SCREEN TERMINAL AND NEAR FIELD COMMUNICATION METHOD, APPARATUS AND SYSTEM THEREOF

CROSS-REFERENCE TO RELATED APPLICATIONS

The present application is a continuation of international application No. PCT/CN2015/077053, filed on Apr. 21, 2015, which claims priority to Chinese Patent Application No. CN201510145892.9, filed on Mar. 30, 2015, both of which are hereby incorporated by reference in its entireties.

TECHNICAL FIELD

The present disclosure relates to the technical field of communications, and in particular, relates to a touch screen terminal and a near field communication method, apparatus and system thereof.

BACKGROUND

At present, near field communication involves two processes, approach detection and data transmission. A touch screen terminal sends an approach detection sequence (for example, an approach detection sequence formed by 6 frequency points); multiple frequency points supported are sequentially scanned; after a response sequence is received from another touch screen terminal, if the signal strength at each frequency point is greater than a predetermined signal strength threshold, it is considered that a signal source is presented at the frequency point; and upon completion of the scanning, if a signal source is present at each of all the frequency points, it is determined that the sequence is valid. After multiple sequence identifications are successful according to an interaction rule, it is determined that a touch screen terminal approaches, and data starts to be sent or received.

However, during communication between a touch screen terminal and an external device, because such interference sources as LCD (for example, the driving signals) and special pictures (for example, gamma maps) would cause interference to the approach detection, therefore the approach detection of the touch screen terminal encounters an error. For example, when the interference is greater or the interference is small but is in coincidence with the valid detection sequence of the approach detection, misjudgments of the approach detection may be caused, such that when no device that needs approach detection approaches, the touch screen terminal considers by mistake that the approach detection is successful in communication and data transmission or data reception starts. In this case, the communication would apparently fail. Therefore, the anti-interference capabilities of the approach detection are poor, and the stability is poor; and thus the LCD interference and different application scenarios may cause an error to the approach detection. As a result, the communication stability of the touch screen terminal varies greatly in different LCD interference strengths and different application scenarios.

SUMMARY

In view of the above, the present disclosure provides a touch screen terminal and a near communication method, apparatus and system thereof, which may lower the probability of misjudgments of approach detection and solve the technical problem that communication stabilities of the touch screen terminal vary greatly in different application scenarios.

The technical solutions disclosed in the present disclosure to address the technical problem may be implemented as follows:

According to one aspect of the present disclosure, a near field communication method is provided. The method can be applied to a touch screen terminal and includes the following steps:

detecting, by the first touch screen terminal, whether a second touch screen terminal having a large-area contact with the first touch screen terminal is present;

if the second touch screen terminal having a large-area contact is detected, performing, by the first touch screen terminal an approach detection for the second touch screen terminal by using a first signal strength threshold, and otherwise, performing an approach detection for the second touch screen terminal by using a second signal strength threshold, wherein the second signal strength threshold is greater than the first signal strength threshold; and when the approach detection is successful, carrying out data transmission with the second touch screen terminal.

According to another aspect of the present disclosure, a near field communication apparatus is provided. The apparatus may be applied to a touch screen terminal and includes:

a large-area contact detecting module, configured to detect whether a second touch screen terminal having a large-area contact with a touch screen of the first touch terminal is present;

an approach detecting module, configured to, if the second touch screen terminal having a large-area contact is detected, perform an approach detection for the second touch screen terminal by using a first signal strength threshold, and otherwise, perform an approach detection for the second touch screen terminal by using a second signal strength threshold, wherein the second signal strength threshold is greater than the first signal strength threshold; and a data transmitting module, configured to, when the approach detection is successful, carry out data transmission with the second touch screen terminal.

According to another aspect of the present disclosure, a touch screen terminal including the above described near field communication apparatus is provided.

With the touch screen terminal and the near field communication method, apparatus and system thereof according to the present disclosure, double judgment criteria may be applied to signals received by a touch screen terminal, large-area contact detection is performed prior to an approach detection process, and a signal strength threshold of the approach detection is determined in real time according to a large-area contact detection result and communication misjudgments are effectively prevented, such that the touch screen terminal is applicable to different LCD interferences and different application scenarios, thereby improving communication stability.

DETAILED DESCRIPTION

To make the technical problem to be solved, technical solutions, and advantages of the present disclosure clearer and more understandable, the present disclosure is further described in detail with reference to the accompanying drawings and specific embodiments. It should be understood that the embodiments described here are only exemplary ones for illustrating the present disclosure, and are not intended to limit the present disclosure.

Embodiment 1

Figure 1:
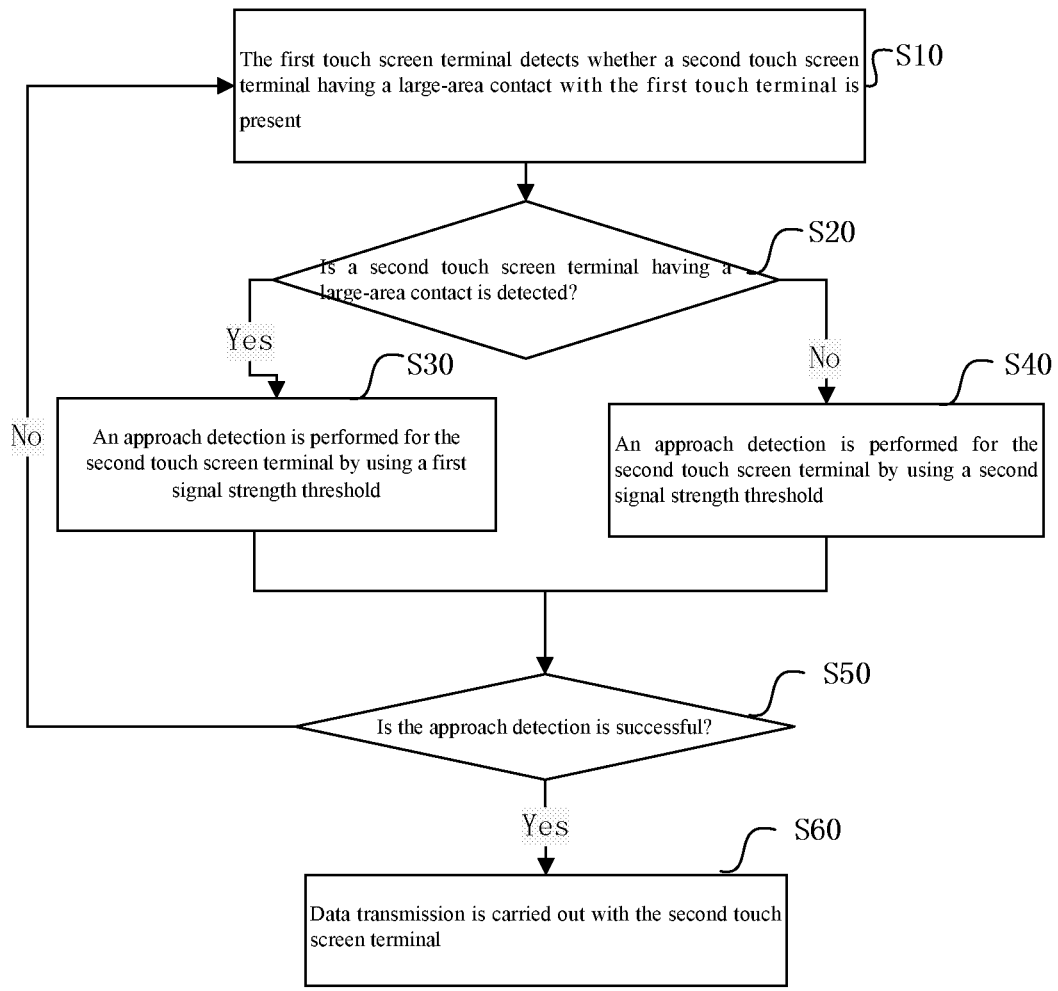
FIG. 1 is a flowchart of a near field communication method according to an embodiment of the present application.

FIG. 1 is a flowchart of a near field communication method according to an embodiment of the present application. The method is applied to a first touch screen terminal, and specifically includes the following steps:

S10: The first touch screen terminal detects whether a second touch screen terminal having a large-area contact with the first touch screen is present.

Specifically, according to the present disclosure, considering the characteristics of near field communication of the touch screen, in most cases, a direct contact is needed between the communication parties; and according to the characteristics of large-area contact and coverage of the touch screen during communication, it may be judged whether another touch screen that needs communication approaches, and the large-area contact detection may employ the mutual-capacitance and self-capacitance data of the touch screen. Prior to the approach detection, the large-area contact detection is additionally performed to determine, according to the large-area contact result, which approach detection threshold is used. Prior to detection that a touch screen that needs communication approaches, successful communication may be carried out with strong valid signals. In this way, misjudgments of the approach detection caused due to interference are effectively reduced, the interference is effectively suppressed, and the probability of entering the communication process by mistake is lowered.

S20: It is judged whether a second touch screen terminal having a large-area contact is detected, if the second touch screen terminal having a large-area contact is detected, step S30 is performed, and otherwise, step S40 is performed.

Specifically, the first signal strength threshold is the signal strength threshold in the related art, and the second signal strength threshold is greater than the first signal strength threshold. If large-area coverage is detected on the touch screen, the entire communication process is the same as that in the related art. If no large-area coverage is detected on the touch screen, the approach detection and the subsequent communication process are performed by raising the signal strength threshold of the approach detection. In this way, the anti-interference capabilities are enhanced.

S30: An approach detection is performed for the second touch screen terminal by using a first signal strength threshold.

Specifically, step S30 further includes: sending an approach detection sequence, receiving a response sequence returned by the second touch screen terminal, and determining, according to an judgment on whether a signal strength amplitude received at each frequency point in the response sequence is greater than the first signal strength threshold, whether the second touch screen terminal approaches.

S40: An approach detection is performed for the second touch screen terminal by using a second signal strength threshold.

Specifically, step S40 further includes: sending an approach detection sequence, receiving a response sequence returned by the second touch screen terminal, and determining, according to an judgment on whether a signal strength amplitude received at each frequency point in the response sequence is greater than the second signal strength threshold, whether the second touch screen terminal approaches.

S50: It is judged whether the approach detection is successful, if the approach detection is successful, step S60 is performed, and otherwise, step S10 is performed.

S60: Data transmission is carried out with the second touch screen terminal.

Specifically, after multiple sequence identifications are successful according to an interaction rule, it is determined that the second touch screen terminal approaches, and data starts to be sent or received.

In addition, corresponding to the near field communication method applied to the first touch screen terminal, an embodiment of the present disclosure further provides a near field communication method applied to a second touch screen terminal. The method is the same as that in the related art, which is thus not described herein any further. Nevertheless, the roles of the first touch screen terminal and the second touch screen terminal may be interchanged. When a touch screen terminal acts as an initiating terminal of the communication, this touch screen terminal functions as the first touch screen terminal; and when a touch screen terminal acts as a receiving terminal of the communication, this touch screen terminal functions as the second touch screen terminal.

In this embodiment of the present disclosure, double judgment criteria are applied to signals received by a touch screen terminal, large-area contact detection is performed prior to an approach detection process, and a signal strength threshold of the approach detection is determined in real time according to a large-area contact detection result and communication misjudgments are effectively prevented, such that the touch screen terminal is applicable to different LCD interferences and different application scenarios, thereby improving communication stability.

Embodiment 2

Figure 2:
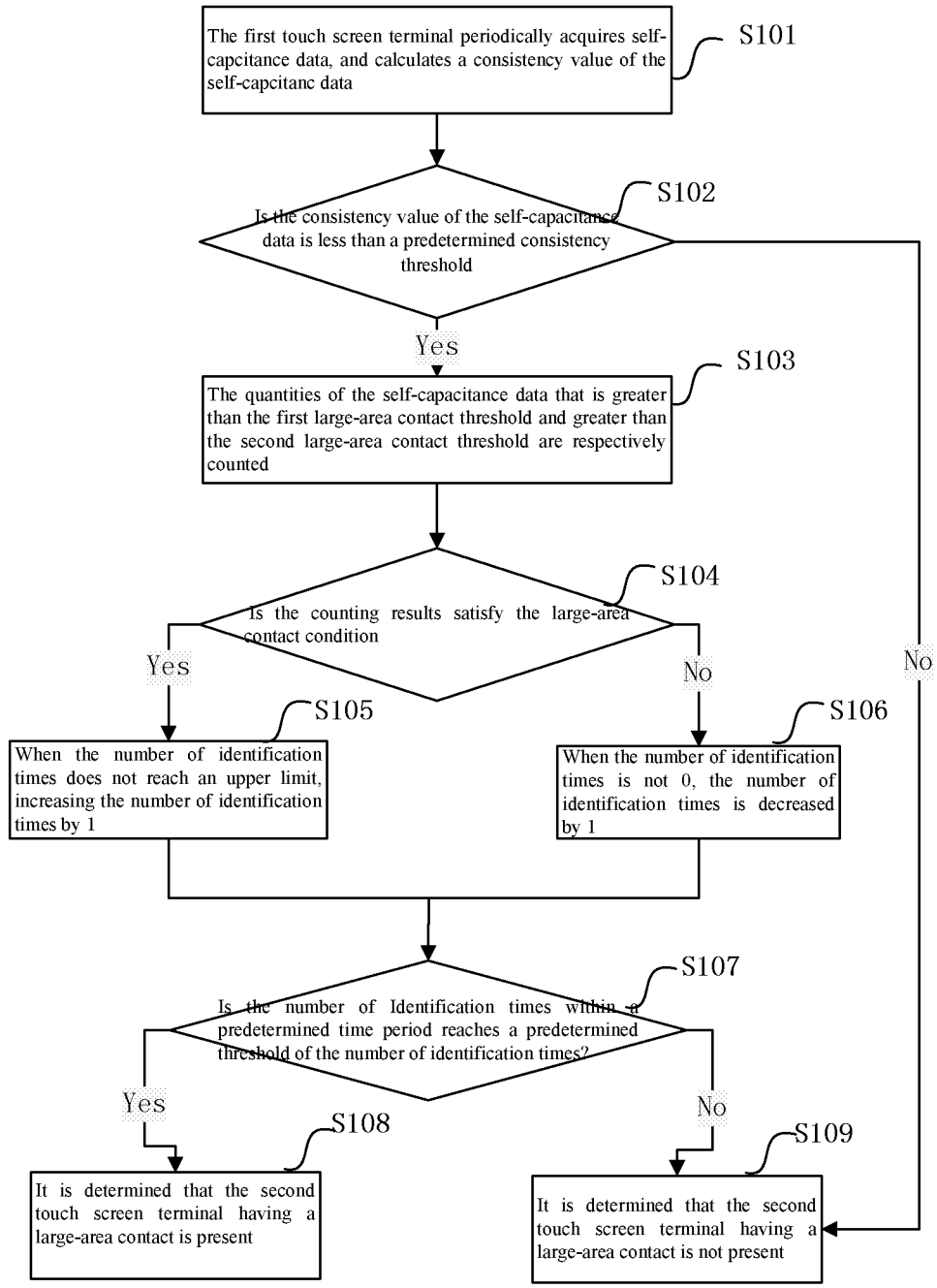
FIG. 2 is a flowchart of an approach detecting method according to an embodiment of the present application.

FIG. 2 is a flowchart of a large-area contact detecting method according to an embodiment of the present application. The method includes the following steps:

S101: The first touch screen terminal periodically acquires self-capacitance data, and calculates a consistency value of the self-capacitance data.

Two touch screen terminals send data by means of lamination of the touch screens (the touch screens need to be adhered to each other for detection of large-area contact). One touch screen terminal serves as a sending end, and generates a signal via a driving electrode; and the other touch screen terminal serves as a receiving end, and receives, via a sensing electrode, the signal sent by the driving electrode of the sending end. In this way, communication is carried out between the two touch screen terminals. The large-area contact detection may employ mutual-capacitance and self-capacitance data of the touch screen. The self-capacitance data refers to a capacitance between an independent conductor (or an sensing pad, a sensing electrode and the like) and the reference ground. The mutual-capacitance data refers to a coupling capacitance generated by coupling of two or more conductors (or sensing pads, sensing electrodes and the like). Through multiple experiments, the consistency value of self-capacitance data caused by multi-finger contact is obviously much greater than the consistency value of the self-capacitance data when the touch screens are subjected to a large-area contact with another touch screen, which is a notable characteristic. The self-capacitance data may better differentiate a large-area contact caused by press of multiple fingers from a large-area contact caused by a large-area contact with another touch screen. Therefore, in this embodiment, the self-capacitance data is preferably used, and the multi-finger contact is prevented from being mistaken as the large-area contact according to the consistency of the self-capacitance data.

Preferably, in step S101, a differential operation and then an add operation may be performed for the full-screen data to reflect the data characteristic of the full screen. Step S101 further includes: periodically calculating, by the first touch screen terminal, a difference between driving data of neighboring driving electrodes and a difference between sensing data of neighboring sensing electrodes; and making a sum of absolute values of the difference of the driving data and the difference of the sensing data to obtain the consistency value of the self-capacitance data. Specifically, the self-capacitance data is categorized into driving data and sensing data. Firstly, a difference between driving data of two neighboring electrodes, for example, the driving data of the $N^{th}$ driving electrode is subtracted from the driving data of the N+1th driving electrode, thus a difference between the driving data is calculated, then the absolute values of the differences between all the driving data is summed; similarly, the sensing data of the $M^{th}$ sensing electrode is subtracted from the sensing data of the $M+1^{th}$ sensing electrode, and the absolute values of the differences between all the sensing data is summed; and finally, an add operation is performed for the sums of the absolute values of the differences therebetween to obtain the consistency value.

S102: It is judged whether the consistency value of the self-capacitance data is less than a predetermined consistency threshold, and if the consistency value of the self-capacitance data is less than the predetermined consistency threshold, step S103 is performed, and otherwise, step S109 is performed.

S103: The quantities of the self-capacitance data that is greater than the first large-area contact threshold and greater than the second large-area contact threshold are respectively counted, wherein the second large-area contact threshold is twice of the first large-area contact threshold.

Specifically, the first large-area contact threshold and the second large-area contact threshold are defined according to experimental data. All the self-capacitance data may be compared with the first large-area contact threshold to count the quantities of the self-capacitance data that is greater than the first large-area contact threshold; and then all the self-capacitance data may be compared with the second large-area contact threshold (for example, the second large-area contact threshold is twice the first large-area contact threshold) to count the quantities of the self-capacitance data that is greater than the second large-area contact threshold. Finally, it is determined, according to the two counting results, whether the large-area contact condition is satisfied.

S104: It is judged whether the counting results satisfy the large-area contact condition, if the counting results satisfy the large-area contact condition, step S105 is performed, and otherwise, step S106 is performed.

S105: When the number of identification times does not reach an upper limit, the number of identification times is increased by 1, and step S107 is performed.

When the large-area contact condition is satisfied, if the number of identification times reaches a predetermined upper limit of the number of identification times, the number of identification times is not increased by 1. This prevents data overflow due to constant accumulation of the number of identification times in case of a long-time communication process, and thus further improves the stability.

S106: When the number of identification times is not 0, the number of identification times is decreased by 1.

When the large-area contact condition is satisfied, if the number of identification times reaches 0 (that is, a lower limit of the number of identification times), the number of identification times is not decreased by 1. This prevents data overflow due to constant decrease of the number of identification times in case that the contact is released from the second touch screen terminal, and thus further improves the stability.

S107: It is judged whether the number of identification times within a predetermined time period reaches a predetermined threshold of the number of identification times, if the number of identification times within a predetermined time period reaches the predetermined threshold of the number of identification times, step S108 is performed, and otherwise, step S109 is performed.

S108: It is determined that the second touch screen terminal having a large-area contact is present, and the process ends.

S109: It is determined that the second touch screen terminal having a large-area contact is not present.

In conclusion, under the circumstance where near field communication is enabled, large-area detection is performed within each cycle; within a configurable time period, large-area detection is performed for multiple times; when large-area contact is detected, the number of identification times is increased by 1; and when the number of large-area contacts detected is greater than or equal to a threshold of the number of identification times (for example, 5 times), it is considered that a near field communication touch screen terminal approaches. In this case, a lower signal strength threshold (the first signal strength threshold) is used. Under circumstances where no large-area contact is detected or large-area contact is detected occasionally, a higher signal strength threshold (the second signal strength threshold) is used, such as the following two cases: there is no large-area contact is detected, that is, the number of times when the large-area contact is detected is 0; or, the number of times when the large-area contact is detected previously is not 0, and no large-area contact is detected subsequently, the number of identification times is decreased by 1, and when the number of identification times is decreased to 0, it is considered that the touch screen leaves or no touch screen approaches; and in this case, use of the high signal strength threshold (the second signal strength threshold) effectively controls misjudgments of communication.

In this embodiment of the present disclosure, self-capacitance data is acquired in real time and a consistency value of the self-capacitance data is calculated, and large-area contact detection is performed according to the self-capacitance data, such that a large-area contact caused by press using multiple fingers is well differentiated from a large-area contact caused by contact on the touch screen. In this way, it may be accurately judged whether a touch screen terminal that needs communication approaches, and thus accuracy of large-area detection is improved.

Embodiment 3

Figure 3:
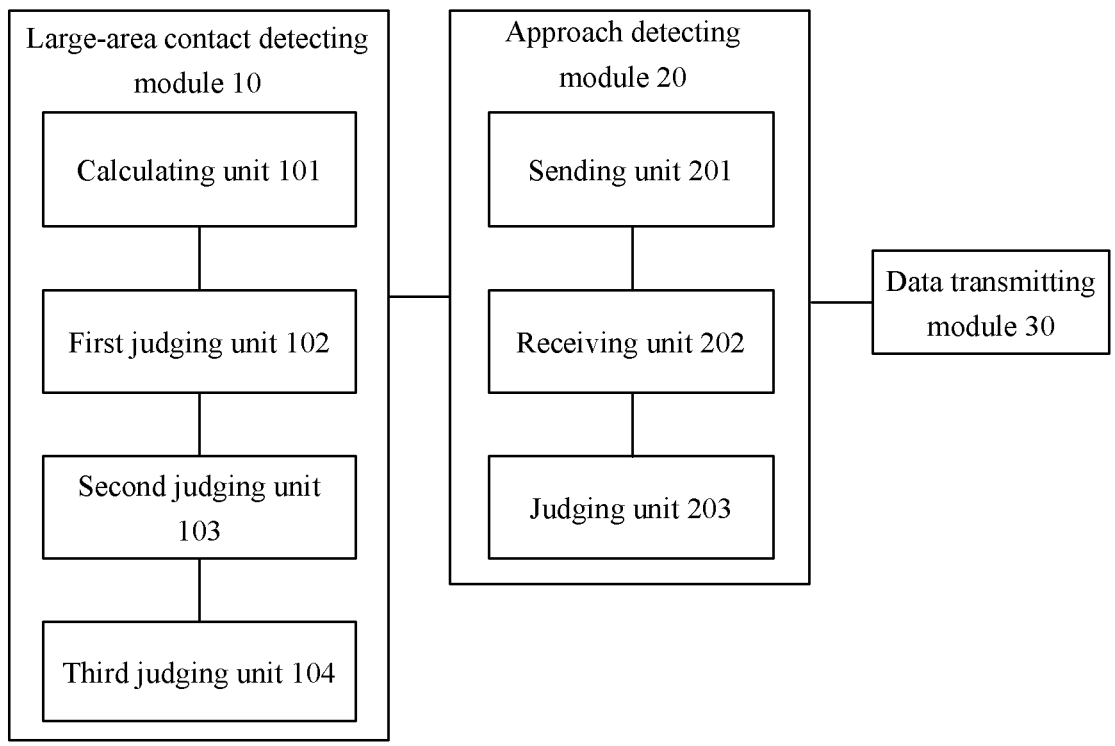
FIG. 3 is a structural diagram of modules of a near field communication apparatus according to an embodiment of the present application.

FIG. 3 is a schematic diagram of modules of a near field communication apparatus according to an embodiment of the present disclosure. The apparatus is applied to a first touch screen terminal, and includes a large-area contact detecting module 10, a near field detecting module 20 and a data transmitting module 30.

The large-area contact detecting module 10 is configured to detect whether a second touch screen terminal having a large-area contact is present.

Specifically, according to the present disclosure, considering the characteristics of near field communication of the touch screen, in most cases, a direct contact is needed between the communication parties; and according to the large-area detecting function of the touch screen, it may be judged whether another touch screen that needs communication approaches, and the large-area contact detection may employ the mutual-capacitance and self-capacitance data of the touch screen. Prior to the approach detection, the large-area contact detection is additionally performed, and it is determined, according to the large-area contact result, which approach detection threshold is used. Prior to detection that a touch screen that needs communication approaches, successful communication may be carried out with strong valid signals. In this way, misjudgments of the approach detection caused due to interference may be effectively reduced, the interference may be effectively suppressed, and the probability of entering the communication process by mistake may be lowered.

The approach detecting module 20 is configured to, if the second touch screen terminal having a large-area contact is detected, perform an approach detection for the second touch screen terminal by using a first signal strength threshold, and otherwise, perform an approach detection for the second touch screen terminal by using a second signal strength threshold, wherein the second signal strength threshold is greater than the first signal strength threshold.

The approach detecting module 20 further includes a sending unit 201, a receiving unit 202 and a judging unit 203.

The sending unit 201 is configured to send an approach detection sequence.

The receiving unit 202 is configured to receive a response sequence returned by the second touch screen terminal.

The determining unit 203 is configured to determine, according to an judgment on whether a signal strength amplitude received at each frequency point in the response sequence is greater than the first signal strength threshold or the second signal strength threshold, whether the second touch screen terminal approaches.

The data transmitting module 30 is configured to, when the approach detection is successful, carry out data transmission with the second touch screen terminal.

In this embodiment, the large-area contact detecting module 10 is additionally configured for detection, and it is determined, according to the large-area contact result, which approach detection threshold is used. Prior to detection that a touch screen that needs communication approaches, successful communication may be carried out with strong valid signals. In this way, misjudgments of the approach detection caused due to interference are effectively reduced, the interference is effectively suppressed, and the probability of entering the communication process by mistake is lowered.

As a preferred embodiment, to better differentiate a large-area contact caused by press using multiple fingers from a large-area contact caused by contact on the touch screen, the multi-finger contact is prevented from being mistaken as the large-area contact by means of consistency of the self-capacitance data according to the characteristic that the consistency value of the self-capacitance data caused by multi-finger contact is obviously much greater than the constancy value of the self-capacitance data when the touch screen approaches. The large-area contact detecting module 10 further includes: a calculating unit 101, a first judging unit 102, a second judging unit 103 and a third judging unit 104.

The calculating unit 101 is configured to periodically acquire self-capacitance data, and calculate a consistency value of the self-capacitance data.

Preferably, the calculating unit 101 is further configured to: periodically acquire full-screen driving data and sensing data, and calculate a difference between driving data of neighboring driving electrodes, and a difference between sensing data of neighboring sensing electrodes; and make a sum of absolute values of the difference of the driving data and the difference of the sensing data to obtain the consistency value of the self-capacitance data.

The first judging unit 102 is configured to judge whether the consistency value of the self-capacitance data is less than a predetermined consistency threshold, and determine that the second touch screen terminal having a large-area contact is not present if the consistency value of the self-capacitance data is greater than a predetermined consistency threshold.

The second judging unit 103 is configured to judge whether the self-capacitance data satisfies a large-area contact condition, increase the number of identification times by 1 if the large-area contact condition is satisfied and the number of identification times does not reach an upper limit, and decrease the number of identification times by 1 if the large-area contact condition is not satisfied and the number of identification times is not 0.

The third judging unit 104 is configured to judge whether the number of identification times within a predetermined time period reaches a predetermined number of identification times, judge that the second touch screen terminal having a large-area contact is present if the number of identification times within a predetermined time period reaches a predetermined number of identification times, and otherwise, judge that the second touch screen terminal having a large-area contact is not present.

The technical features in Embodiments 1 and 2 illustrating the method are also applicable in Embodiment 3 illustrating the apparatus, which are thus not described herein any further.

Embodiment 4

Figure 4:
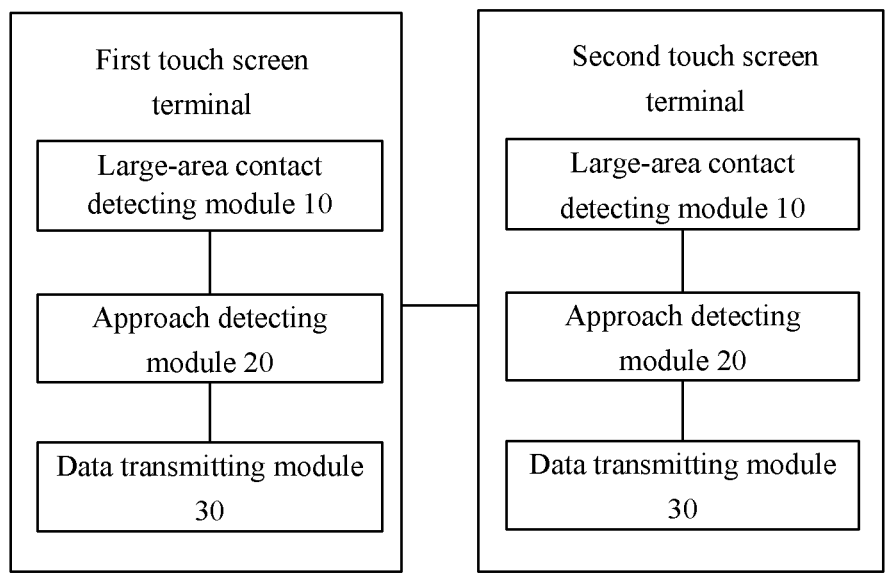
FIG. 4 is a structural diagram of a near field communication system according to an embodiment of the present application.

As illustrated in FIG. 4, an embodiment of the present disclosure provides a near field communication system including a first touch screen terminal and a second touch screen terminal, wherein the first touch screen terminal or the second touch screen terminal includes the near field communication apparatus as described in Embodiment 3. It should be noted that the technical features in Embodiments 1, 2 and 3 illustrating the method are also applicable in this embodiment, which are thus not described herein any further.

As a preferred solution, the first touch screen terminal and the second touch screen terminal includes, but not limited to, a capacitive touch screen terminal (for example, an iPhone and an iPad), and a terminal equipped with a touch panel, a touch key or a touch slide bar (for example, a Notebook, an iPad and the like). The touch screen terminal in the embodiments of the present disclosure may be connected to another touch screen terminal via such interfaces as a USB interface, an HDMI interface, an audio input/output (for example, a headphone jack) and the like, to implement the near field communication function.

It is understandable to those skilled in the art that all or partial steps of the method described in the above embodiments can be implemented by controlling relevant hardware by programs. The programs may be stored in a computer readable storage medium. The storage medium may be a read only memory (ROM), random access memory (RAM), a magnetic disk or a compact disc read-only memory (CD-ROM).

The preferred embodiments of the present disclosure are described with reference to the accompanying drawings, but the scope of the present disclosure is not limited to such embodiments. A person skilled in the art would derive various modifications or variations to practice the present disclosure without departing from the scope and essence of the present disclosure. For example, the features disclosed in one embodiment may be used to another embodiment to derive still another embodiment. Any modifications, equivalent replacements and improvements made within the technical concept of the present disclosure shall fall within the scope defined by the claims of the present disclosure.

INDUSTRIAL APPLICABILITY

With the touch screen terminal and the near field communication method, apparatus and system thereof according to the present disclosure, double judgment criteria are applied to signals received by a touch screen terminal, large-area contact detection is performed prior to an approach detection process, and a signal strength threshold of the approach detection is determined in real time according to a large-area contact detection result and communication misjudgments are effectively prevented, such that the touch screen terminal is applicable to different LCD interferences and different application scenarios, thereby improving communication stability.

In addition, self-capacitance data is acquired in real time and a consistency value of the self-capacitance data is calculated, and large-area contact detection is performed according to the self-capacitance data, such that a large-area contact caused by press using multiple fingers is well differentiated from a large-area contact caused by contact on the touch screen. In this way, it may be accurately judged whether a touch screen terminal that needs communication approaches, and thus accuracy of large-area detection is improved.

What is claimed is:

1. A near field communication method, comprising:
   detecting, by a first touch screen terminal, whether a second touch screen terminal having a large-area contact with the first touch screen terminal is present;
   if the second touch screen terminal having a large-area contact is detected, performing, by the first touch screen terminal, an approach detection for the second touch screen terminal by using a first signal strength threshold, otherwise, performing an approach detection for the second touch screen terminal by using a second signal strength threshold, wherein the second signal strength threshold is greater than the first signal strength threshold; and
   when the approach detection is successful, carrying out data transmission with the second touch screen terminal;
   wherein the detecting, by the first touch screen terminal, whether a second touch screen terminal having a large-area contact with the first touch terminal is present comprises:
      periodically acquiring, by the first touch screen terminal, self-capacitance data of the first touch terminal, and calculating a consistency value of the self-capacitance data;
      judging whether the consistency value of the self-capacitance data is less than a predetermined consistency threshold; and
      judging whether the self-capacitance data satisfies a large-area contact condition if the consistency value of the self-capacitance data is less than the predetermined consistency threshold, or judging that the second touch screen terminal having a large-area contact is not present if the consistency value of the self-capacitance data is not less than the predetermined consistency threshold.

2. The near field communication method according to claim 1, further comprising:
   increasing the number of identification times by 1 if the large-area contact condition is satisfied and the number of identification times does not reach an upper limit, and decreasing the number of identification times by 1 if the large-area contact condition is not satisfied and the number of identification times is not 0; and
   judging whether the number of identification times within a predetermined time period reaches a predetermined number of identification times, judging that the second touch screen terminal having a large-area contact is present if the number of identification times within a predetermined time period reaches a predetermined number of identification times, and otherwise, judging that the second touch screen terminal having a large-area contact is not present.

3. The near field communication method according to claim 1, wherein the periodically acquiring, by the first touch screen terminal, self-capacitance data of the first touch screen terminal, and calculating a consistency value of the self-capacitance data comprises:
   periodically acquiring, by the first touch screen terminal, full-screen driving data and sensing data;
   calculating a difference between driving data of neighboring driving electrodes, and a difference between sensing data of neighboring sensing electrodes; and
   making a sum of absolute values of the difference of the driving data and the difference of the sensing data to obtain the consistency value of the self-capacitance data.

4. The near field communication method according to claim 3, wherein the judging whether the self-capacitance data satisfies a large-area contact condition comprises:
   respectively counting the quantities of the self-capacitance data that is greater than the first large-area contact threshold and greater than the second large-area contact threshold, wherein the second large-area contact threshold is twice of the first large-area contact threshold; and
   determining, according to two counting results, whether the large-area contact condition is satisfied.

5. The near field communication method according to claim 1, wherein the performing an approach detection for the second touch screen terminal by using a first signal strength threshold comprises:
   sending an approach detection sequence, receiving a response sequence returned by the second touch screen terminal, and determining, according to an judgment on whether a signal strength amplitude received at each frequency point in the response sequence is greater than the first signal strength threshold, whether the second touch screen terminal approaches; and the performing an approach detection for the second touch screen terminal by using a second signal strength threshold comprises:

sending an approach detection sequence, receiving a response sequence returned by the second touch screen terminal, and determining, according to an judgment on whether a signal strength amplitude received at each frequency point in the response sequence is greater than the second signal strength threshold, whether the second touch screen terminal approaches.

6. A near field communication apparatus, applied to a first touch screen terminal, the apparatus comprising:

a large-area contact detecting module, configured to detect whether a second touch screen terminal having a large-area contact with a touch screen of the first touch terminal is present;

an approach detecting module, configured to, if the second touch screen terminal having a large-area contact is detected, perform an approach detection for the second touch screen terminal by using a first signal strength threshold, and otherwise, perform an approach detection for the second touch screen terminal by using a second signal strength threshold, wherein the second signal strength threshold is greater than the first signal strength threshold; and a data transmitting module, configured to, when the approach detection is successful, carry out data transmission with the second touch screen terminal;

wherein the large-area contact detecting module comprises:

a calculating unit, configured to periodically acquire self-capacitance data of the first touch terminal, and calculate a consistency value of the self-capacitance data; and a first judging unit, configured to judge whether the consistency value of the self-capacitance data is less than a predetermined consistency threshold, and determine that the second touch screen terminal having a large-area contact is not present if the consistency value of the self-capacitance data is greater than the predetermined consistency threshold.

7. The near field communication apparatus according to claim 6, wherein the large-area contact detecting module further comprises;

a second judging unit, configured to judge whether the self-capacitance data satisfies a large-area contact condition, increase the number of identification times by 1 if the large-area contact condition is satisfied and the number of identification times does not reach an upper limit, and decrease the number of identification times by 1 if the large-area contact condition is not satisfied and the number of identification times is not 0; and a third judging unit, configured to judge whether the number of identification times within a predetermined time period reaches a predetermined number of identification times, judge that the second touch screen terminal having a large-area contact is present if the number of identification times within a predetermined time period reaches a predetermined number of identification times, and otherwise, judge that the second touch screen terminal having a large-area contact is not present.

8. The near field communication apparatus according to claim 6, wherein the calculating unit is further configured to:

periodically acquire full-screen driving data and sensing data, and calculate a difference between driving data of neighboring driving electrodes, and a difference between sensing data of neighboring sensing electrodes; and make a sum of absolute values of the difference of the driving data and the difference of the sensing data to obtain the consistency value of the self-capacitance data.

9. The near field communication apparatus according to claim 8, wherein the second judging unit is further configured to:

respectively count the quantities of the self-capacitance data that is greater than the first large-area contact threshold and greater than the second large-area contact threshold, wherein the second large-area contact threshold is twice of the first large-area contact threshold; and determine, according to two counting results, whether the large-area contact condition is satisfied.

10. The near field communication apparatus according to claim 6, wherein the approach detecting module comprises:

a sending unit, configured to send an approach detection sequence;

a receiving unit, configured to receive a response sequence returned by the second touch screen terminal; and a determining unit, configured to determine, according to an judgment on whether a signal strength amplitude received at each frequency point in the response sequence is greater than the first signal strength threshold or the second signal strength threshold, whether the second touch screen terminal approaches.

11. A touch screen terminal, comprising the near field communication apparatus, wherein the near field communication apparatus comprises:

a touch screen;

a large-area contact detecting module, configured to detect whether a second touch screen terminal having a large-area contact with the touch screen is present;

an approach detecting module, configured to, if the second touch screen terminal having a large-area contact is detected, perform an approach detection for the second touch screen terminal by using a first signal strength threshold, and otherwise, perform an approach detection for the second touch screen terminal by using a second signal strength threshold, wherein the second signal strength threshold is greater than the first signal strength threshold; and a data transmitting module, configured to, when the approach detection is successful, carry out data transmission with the second touch screen terminal;

wherein the large-area contact detecting module comprises:

a calculating unit, configured to periodically acquire self-capacitance data of the first touch terminal, and calculate a consistency value of the self-capacitance data; and a first judging unit, configured to judge whether the consistency value of the self-capacitance data is less than a predetermined consistency threshold, and determine that the second touch screen terminal having a large-area contact is not present if the consistency value of the self-capacitance data is greater than the predetermined consistency threshold.

12. The touch screen terminal according to claim 11, wherein the large-area contact detecting module further comprises;
    a second judging unit, configured to judge whether the self-capacitance data satisfies a large-area contact condition, increase the number of identification times by 1 if the large-area contact condition is satisfied and the number of identification times does not reach an upper limit, and decrease the number of identification times by 1 if the large-area contact condition is not satisfied and the number of identification times is not 0; and
    a third judging unit, configured to judge whether the number of identification times within a predetermined time period reaches a predetermined number of identification times, judge that the second touch screen terminal having a large-area contact is present if the number of identification times within a predetermined time period reaches a predetermined number of identification times, and otherwise, judge that the second touch screen terminal having a large-area contact is not present.

13. The touch screen terminal according to claim 11, wherein the calculating unit is further configured to:
    periodically acquire full-screen driving data and sensing data, and calculate a difference between driving data of neighboring driving electrodes, and a difference between sensing data of neighboring sensing electrodes; and make a sum of absolute values of the difference of the driving data and the difference of the sensing data to obtain the consistency value of the self-capacitance data.

14. The touch screen terminal according to claim 13, wherein the second judging unit is further configured to:
    respectively count the quantities of the self-capacitance data that is greater than the first large-area contact threshold and greater than the second large-area contact threshold, wherein the second large-area contact threshold is twice of the first large-area contact threshold; and
    determine, according to two counting results, whether the large-area contactcondition is satisfied.

15. The touch screen terminal according to claim 11, wherein the approach detecting module comprises:
    a sending unit, configured to send an approach detection sequence;
    a receiving unit, configured to receive a response sequence returned by the second touch screen terminal; and
    a determining unit, configured to determine, according to an judgment on whether a signal strength amplitude received at each frequency point in the response sequence is greater than the first signal strength threshold or the second signal strength threshold, whether the second touch screen terminal approaches.

* * * * *